United States Patent
Le Creff et al.

(10) Patent No.: US 7,068,781 B2
(45) Date of Patent: Jun. 27, 2006

(54) ALARM OF A TELECOMMUNICATIONS TERMINAL CONNECTED TO A LAN

(75) Inventors: Michel Le Creff, Vigny (FR); Gérard Vergnaud, Franconville (FR); Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 750 days.

(21) Appl. No.: 10/253,800

(22) Filed: Sep. 25, 2002

(65) Prior Publication Data

US 2003/0072438 A1    Apr. 17, 2003

(30) Foreign Application Priority Data

Oct. 15, 2001   (EP)   .................................. 01440343

(51) Int. Cl.
*H04M 1/00*   (2006.01)
(52) U.S. Cl. ........................ 379/413; 379/386; 379/400
(58) Field of Classification Search ................ 379/386, 379/400, 413
See application file for complete search history.

(56) References Cited

U.S. PATENT DOCUMENTS

| 6,115,468 A | 9/2000 | De Nicolo |
| 6,218,930 B1 | 4/2001 | Katzenberg et al. |
| 6,804,351 B1 * | 10/2004 | Karam ....................... 379/413 |

FOREIGN PATENT DOCUMENTS

EP    1100226 A1    5/2001

* cited by examiner

*Primary Examiner*—Jefferey F. Harold
(74) *Attorney, Agent, or Firm*—Sughrue Mion, PLLC

(57) ABSTRACT

Before any supply of remote power to a telecommunications terminal connected to a local area network, the Ethernet equipment must recognize the power class of the terminal by measuring a specific electrical signature of the terminal via their interconnection. If the Ethernet equipment is unable to supply the required power, then it will send a specific signal via the interconnection which will activate an alarm on the terminal. The possibility to be alerted by a specific alarm from the terminal if no remote power can be supplied to it, will advantageously inform the terminal user of the problem and allow the user to look for an alternative.

16 Claims, 3 Drawing Sheets

FIG_1

ALARM OF A TELECOMMUNICATIONS TERMINAL CONNECTED TO A LAN

TECHNICAL FIELD OF THE INVENTION

The present invention relates generally to a data processing local area network LAN, for example an Ethernet network. To be more precise, the invention relates to a method of providing a signal to a terminal in a LAN while said terminal being remotely powered from an Ethernet equipment via first and second pairs of wires that carry data between the terminal and the Ethernet equipment. Furthermore, the present invention relates to a terminal to be remotely powered and an Ethernet equipment. The invention is based on a priority application EP 01 440 343.0 which is hereby incorporated by reference.

BACKGROUND OF THE INVENTION

The growth of the Internet and similar local and wide area networks (LAN and metropolitan ones) based on Ethernet technology has created a potential market for telecommunications systems to be connected directly to such networks. A typical Ethernet connection to an office location with a telecommunications system is usually based on the use of half of the 8 wires of a line L separated in two unshielded twisted pair of wires giving—one pair for transmission Tx, one for reception Rx. The transmission pair is dedicated to send packets of data over the Ethernet connection; the reception pair receives packets of data over the Ethernet connection. The four other wires are usually not used for data transmission.

On the IEEE forum 802.3 (Ethernet) was set a subgroup 802.3af dealing with remote powering of data terminal equipment DTE connected to an Ethernet interface i.e. a DTE powered by a media dependent interface MDI. There is discussed the possibilities and feasibility to remotely power a terminal via center tops using two pairs of wires of the line L as conductors of a phantom circuit. Particularly in U.S. Pat. No. 6,115,468 is disclosed an Ethernet device power transmission system providing electrical power to telecommunications terminals such as Ethernet telephones and related equipment over a 4-wire Ethernet connection. This is achieved without the need for rewiring premises having an existing 4-wire Ethernet system. This system includes an input transformer, an output transformer and a pair of twisted pair conductors. The input transformer includes a pair of primaries for connection to a source of Ethernet data. The input transformer also includes a pair of secondaries, each having a center-tap. A first twisted pair conductor is connected across the first secondary, a second twisted pair conductor is connected across the second secondary and a DC-bias is provided between the respective center tops of the first and second secondaries. At the local end, the output transformer includes a first and second center-tapped primary and a first and second secondary for connection to the load device. The first and second primary center taps are connected to a power processor for extraction of DC power.

In EP1100226 is disclosed a more specific method of providing a remote power feed to a telecommunications terminal over an Ethernet connection. Previously sending a power supply current over that connection, at least one detection signal on at least two conductors of that connection is fed for detecting the presence of a telecommunications terminal adapted to receive a remote power feed. Applying such method shall prevent all risk to such terminal because the remote power feed current is sent only if the terminal has been identified as one which is adapted to receive a remote power feed. The intensity and duration of the detection signal are chosen so that the operation of detecting the terminal cannot cause any damage if it is not one which is adapted to receive a remote power fed.

The detection signal characterizing said DTE is defined by a signature usually an impedance of a predefined value connected to the two center tops of the transformers to which the two pairs of wires are connected. On the above cited IEEE forum are set values of impedance for each different power class of terminals to be connected to a LAN. In case said DTE is connected to the LAN via a RJ-45 connector i.e. via a line L made of two couples of two pairs of wires, then the some impedance is also connected to the two center taps of the transformer to which the two pairs of the other couple are connected. After the correct recognition of the power class of the DTE, the required power supply will be applied on one or both of the two couples of two pairs of wires used possibly as conductors of a phantom circuit. Moreover, the DTE contains two detectors each one connected at the two center taps corresponding to a couple of two pairs of wires. These detectors measure the corresponding voltage present at the respective two center taps. When such measure exceeds a predefined value then they activate a respective switch letting said power supply remotely powering said DTE.

A problem will appear when the required power for a specific terminal can not be supplied by any Ethernet equipment coupled to said DTE via said line. This may occur when the power class of the DTE will exceed the maximum power which can be supplied by the corresponding Ethernet equipment. In that case, no power at all will be supplied to this DTE. And the user of such DTE will not be aware about the origin of the power supply problem. He/she may believe of a breakdown of its terminal or the line.

SUMMARY OF THE INVENTION

It is an object of the present invention to develop a method and a terminal which will give a possibility for the user of such telecommunications terminal to recognize the situation when no remote power can be supplied to such terminal.

This object is attained by a method of supplying power to a terminal from Ethernet equipment via first and second pairs of wires that carry data between the terminal and the Ethernet equipment, the method comprising: determining whether the Ethernet equipment is capable of meeting power requirements of the terminal; if the Ethernet equipment is not capable of meeting the power requirements, sending a first signal via the first and second pairs of wires to the terminal to notify that the Ethernet equipment is not capable of meeting the power requirements, wherein the first signal comprises a difference between bias voltages applied to the first and second pairs of wires, respectively.

Furthermore, its object is attained by a terminal capable of being coupled to a network over a line comprising first and second pairs of wires and receiving power via the first and second pairs of wires, the terminal comprising: a center tap transformer comprising a first transformer and a second transformer, the first and second transformers capable of being coupled to the first and second pairs of wires, respectively, of the line; an electrical signature coupled between center taps of the first and second transformers, the electrical signature specifying a power class of the terminal, which can be determined by Ethernet equipment via the first and second pairs of wires; and a first detector capable of detecting a signal transmitted via the first and second pairs of wires, said signal notifying the terminal of an inability to be remotely powered.

And its object is attained by an Ethernet equipment capable of being coupled to a network over a line comprising first and second pairs of wires to a second Ethernet equipment, the Ethernet equipment comprising:

a center tap transformer comprising first and second transformers, said first and second transformers capable of being coupled via the first and second pairs of wires, respectively, to a center tap transformer of the second Ethernet equipment; an electrical circuit coupled to center taps of the first and second transformers, the electrical circuit being capable of sending a first signal to the second Ethernet equipment via the first and second pairs of wires to determine power requirements of the second Ethernet equipment; and Ethernet equipment capable of being coupled to a network over a line comprising first and second pairs of wires to a second Ethernet equipment, the Ethernet equipment comprising: a center tap transformer comprising first and second transformers, said first and second transformers capable of being coupled via the first and second pairs of wires, respectively, to a center tap transformer of the second Ethernet equipment; an electrical circuit coupled to center tops of the first and second transformers, the electrical circuit being capable of sending a first signal to the second Ethernet equipment via the first and second pairs of wires to determine power requirements of the second Ethernet equipment; and means coupled to the electrical circuit capable of sending a second signal via the first and second pairs of wires to notify the second Ethernet equipment of the inability to be remotely powered, the second signal being sent when the Ethernet equipment is not capable of meeting the power requirements of the second Ethernet equipment.

It is advantageously taken profit of the fact that before any supply of remote power to a telecommunications terminal connected to a local area network, the Ethernet equipment must recognize the power class of said terminal by measuring a specific electrical signature of said terminal via their interconnection. In the case said Ethernet equipment will stand in a situation unable to supply the required power, then it will send a specific signal via said interconnection which will activate an alarm on said terminal.

The possibility to be alerted by a specific alarm from said terminal in the case no remote power can be supplied to it, will advantageously inform the user of that terminal about the powering situation. This will prevent any confusion about the reason of a wrong running of that terminal and may allow to look for an alternative.

Further advantageous features of the invention are defined in the dependent claims and will become apparent from the following description and the drawings.

BRIEF DESCRIPTION OF THE DRAWINGS

Two embodiments of the invention will now be explained in more details with reference to the accompanying drawings, in which.

DETAILED DESCRIPTION OF PREFERRED EMBODIMENTS

Figure 1:
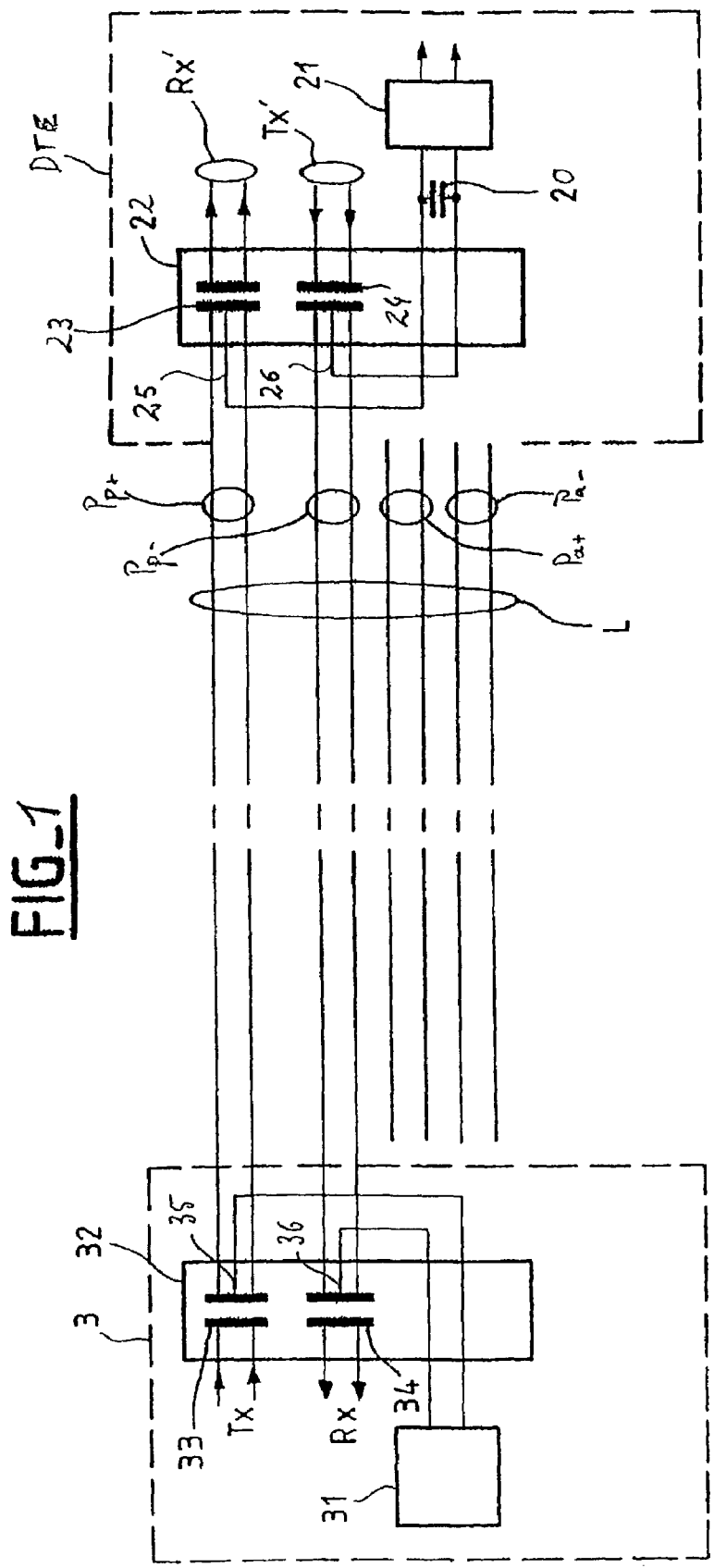
FIG. 1 is a schematic view of a terminal connected via a line L to some power supply equipment.

FIG. 1 is a schematic view of a terminal DTE, usually a telecommunications terminal like an IP-phone connected to a local area network via a line L. Such terminal DTE which can be remotely powered is then coupled via L to some Ethernet equipment 3. Said terminal DTE will be remotely powered by some remote power feed unit 31 possibly located in such Ethernet equipment 3 being a switch, a concentrator or a repeater (also known as a hub). Latter is then used to supply or transfer remotely some power to said terminal DTE.

A line L, typically, is made of 8 wires divided in two couples of two pairs of wires Pp+, Pp−; Pa+, Pa−. One Pp+, Pp− of the two couples is used for data transfer between the LAN and said terminal DTE. For example, a pair Pp+ is used to send data from the LAN i.e. from the Ethernet equipment 3 towards Rx' the terminal DTE. And the other pair Pp− of wires from this couple is used to send data from the terminal DTE towards Tx' the LAN. The other couple of the two pairs Pa+, Pa− of wires which are connected at Ethernet equipment 3 side to some units not shown on the FIG. 1 may be let unused.

In FIG. 1, the remote power feed is provided via a common mode phantom circuit. Each pair of wires of the used couple Pp+, Pp− are connected to some transformer 33, 34 of a center tap transformer 32 from said Ethernet equipment 3 and on the terminal DTE side to some transformer 23, 24 respectively of a center tap transformer 22. Power supply for remotely powering said terminal DTE will be applied by said power feed unit 31 at center tops 35, 36 of the used transformer 33, 34. This supply power will be collected by some collector 21 in the terminal DTE at center taps 25, 26 of the respective transformer 23, 24 from its center tap transformer 22. And the couple of pairs of wires Pp+ and Pp− will then be used as conductors of a phantom circuit.

The power feed unit 31 is adapted to detect the presence of a terminal being able to be remotely powered. This is performed by sending some signal allowing to recognize some electrical signature usually an impedance 20 connected to the center taps 25, 26 of the transformer 23, 24 of the terminal specific for such terminal. The value of the measured impedance 20 will then define the amount of power required by said terminal DTE to be supplied by said power feed unit 31.

In a variant, the power feed unit 31 and the center tap transformer 32 can be in a separate module and completely independent of the Ethernet equipment 3, that module being simply inserted into the line L.

Figure 2:
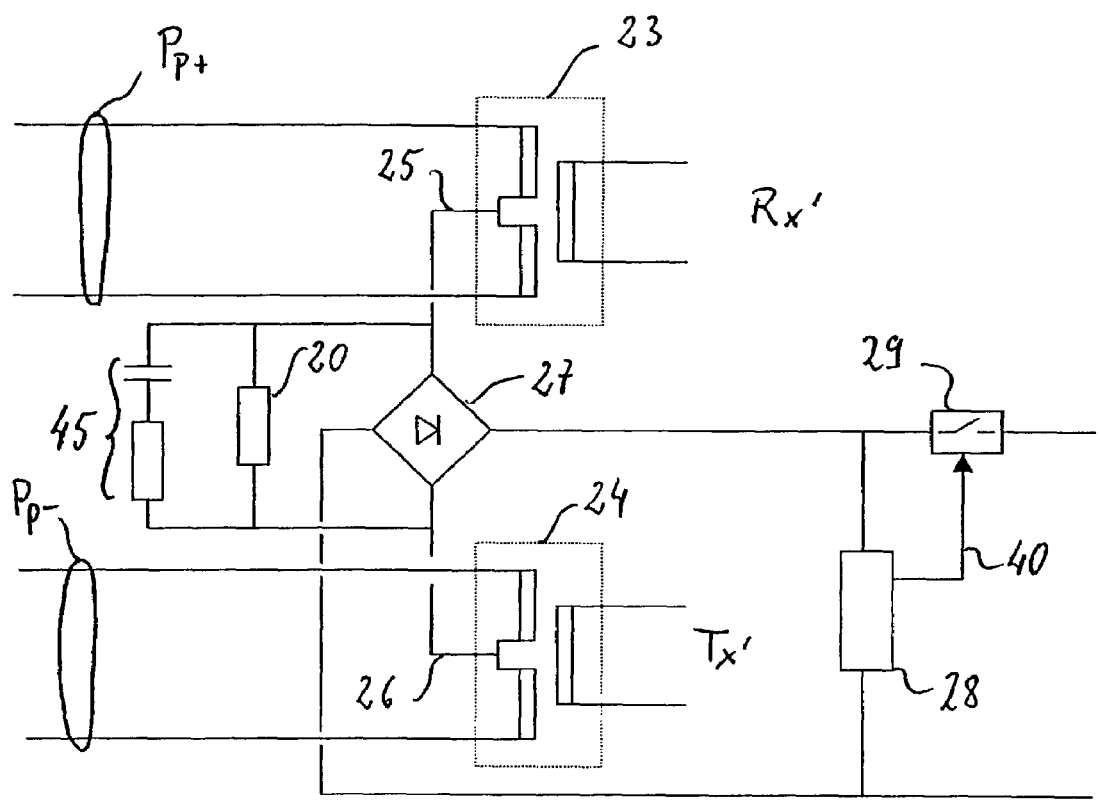
FIG. 2 is a schematic view of a terminal according to a first embodiment of the invention.
Figure 3:
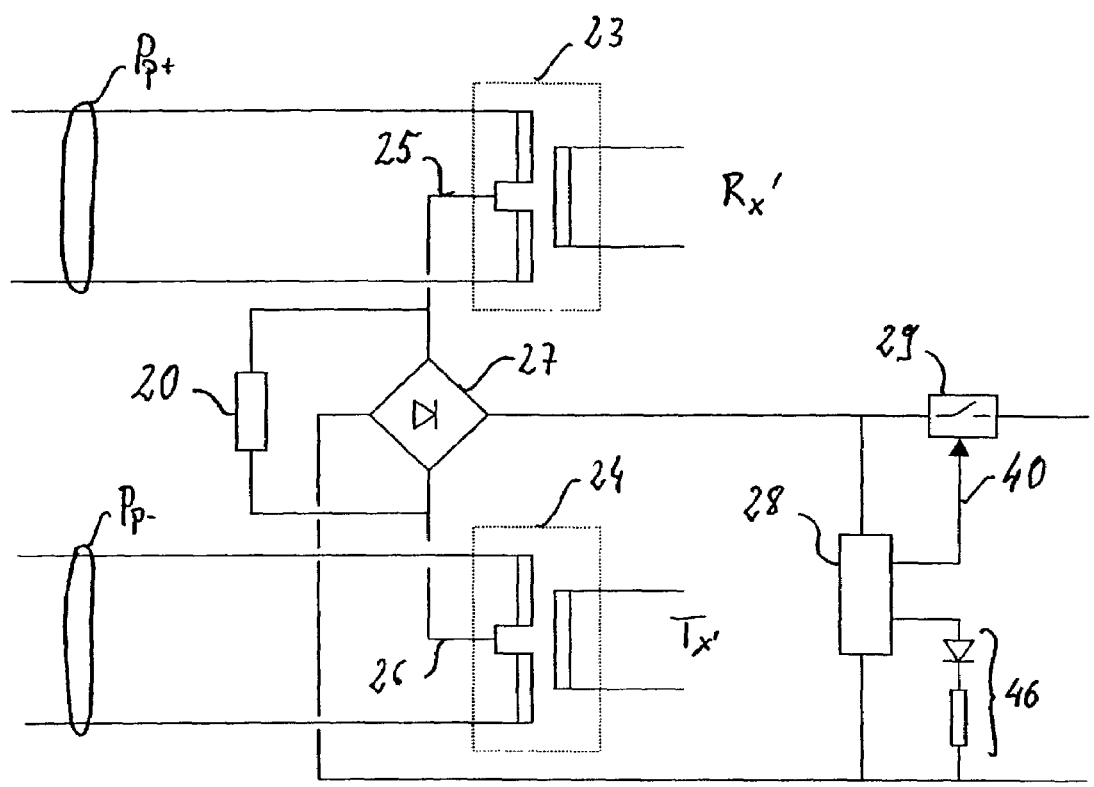
FIG. 3 is a schematic view of a terminal according to a second embodiment of the invention.

In FIGS. 2 and 3 are shown schematically the interface of a terminal DTE to the line L according to two different embodiments of the invention. In both embodiments, the terminal DTE is connected in a same way to the line L via the transformers 23, 24 to which are connected the couple of pairs Pp+, Pp− of wires. The impedance 20 is connected in parallel to a rectifier bridge 27 connected itself to the two center taps 25, 26 of the transformer 23, 24 of the terminal center tap transformer 22. A switch 29 is connected after the rectifier bridge 27 and before the collector 21 (not shown on the FIGS. 2 and 3) to allow to disconnect that collector 21 from the phantom circuit. Said switch 29 is controlled 40 by some detector 28 connected to the terminals of the rectifier bridge 27. That detector analyzes the power present on the line L and accordingly activates or inhibits 40 the switch 29.

The switch 29 shall stay in an open stage when no adequate remote powering is present on the line L. Indeed, when the Ethernet equipment 3 sends some signals to measure the electrical signature of said terminal DTE, the switch 29 being open will hide the collector 21 so to allow a sure a rapid measurement of the corresponding impedance 20. Therefore, it is possible to set up the detector 28 to keep the switch 29 in an open stage in any case when the power present on the phantom circuit is lower than a predefined value—threshold voltage—corresponding to a correct remote powering of said terminal DTE. As soon as the power exceeds said threshold voltage, the detector 28 will then activate 40 the switch 29 to allow the collector 21 to receive the power required for a correct running of said terminal DTE.

According to the present invention, in case the Ethernet equipment 3 is unable to supply the required power for that terminal DTE, it will send some specific signal via the same phantom circuit to alert said terminal DTE about the situation. This signal is performed by some electrical circuit, possibly the same which had send before some recognition signal to said terminal DTE via the line L as a measure of said electrical signature 20. The alert signal will then notify to said terminal DTE of the incapacity to be remotely powered.

The terminal DTE according to the present invention will be able to detect such alert signal using some detector 45, 46. In a first embodiment according to the invention, this alert signal is sent using an alternating voltage over a short time. This alternating signal after being rectified by the rectifier bridge 27, must give a direct voltage low enough not to be mix up by the detector 28 as a remote powering. Such signal will be detected by a detector 45 connected in parallel to the impedance 20 as shown in FIG. 2.

In a second embodiment according to the invention, this alert signal is sent using a direct voltage. The voltage value will be greater as the one used to recognize the impedance 20 but lower than the one for a remote powering of said terminal DTE. Such signal can be detected by the detector 28 or a further detector 46 connected to said detector 28 as shown in FIG. 3.

In both cases, the alert signal when detected by the respective detector 45, 46 will activates some alarm. This alarm can be of the kind of an activated buzzer or the flashing of some light like a LED or even the notification of some message on a display of said terminal DTE. In any case, the chosen alarm must be easily recognizable by the user of said terminal DTE as being a specified alarm when a remote powering of the terminal via the line L is not possible. In that case, the user may be in a possibility to look for alternatives like to find another power supply (local one) or another terminal. Advantageously, the user will not be confused in believing that its terminal is broken and be accordingly fully informed about the reason of the wrong running.

In the case that the terminal DTE may be possibly alternatively powered via a local supply i.e. not using any remote powering via the line L, then such local powering can be used to run the alarm after detection of the alert signal. This will then allow to use some alarm which are more power demanding like displaying some more complex message informing the user of the impossibility to let remotely powering its terminal DTE.

The invention claimed is:

1. A method of supplying power to a terminal from Ethernet equipment via first and second pairs of wires that carry data between the terminal and the Ethernet equipment, the method comprising:
   determining whether the Ethernet equipment is capable of meeting power requirements of the terminal;
   if the Ethernet equipment is not capable of meeting the power requirements, sending a first signal via the first and second pairs of wires to the terminal to notify that the Ethernet equipment is not capable of meeting the power requirements, and
   activating an alarm of the terminal using said first signal, wherein
   said determining step comprises sending a second signal from the Ethernet equipment to the terminal via the first and second pairs of wires to detect an electrical signature indicative of a power class of the terminal, and
   the first and second signals each comprise a difference between bias voltages applied to the first and second pairs of wires.

2. The method according to claim 1,
   wherein the first pair is capable of carrying data from a center tap transformer of the Ethernet equipment to a center tap transformer of the terminal and the second pair is capable of carrying data in an opposite direction, and
   wherein the center tap transformer of the terminal comprises first and second transformers that are coupled to the first and second pairs of wires, respectively.

3. The method according to claim 2, wherein the terminal further comprises a detector, the method further comprising detecting the first signal using the detector, wherein activating the alarm comprises the detector activating the alarm in response to the first signal.

4. The method according to claim 3, wherein the first signal comprises an ac voltage signal, and wherein the detector is coupled in parallel with the electrical signature between center taps of the first and second transformers.

5. The method according to claim 3, wherein the first signal comprises a dc voltage signal, wherein the terminal further comprises a rectifier bridge coupled between center taps of the first and second transformers, and wherein the detector is coupled to terminals of the rectifier bridge.

6. The method according to claim 2, further comprising:
   if the Ethernet equipment is capable of meeting the power requirements, supplying power to the terminal as a difference between voltages at center taps of the first and second transformers, respectively.

7. A method of supplying power to a terminal from Ethernet equipment via first and second pairs of wires that carry data between the terminal and the Ethernet equipment, the method comprising:
   determining whether the Ethernet equipment is capable of meeting power requirements of the terminal; and
   if the Ethernet equipment is not capable of meeting the power requirements, sending a first signal via the first and second pairs of wires to the terminal to notify that the Ethernet equipment is not capable of meeting the power requirements, wherein
   the first signal comprises a difference between bias voltages applied to the first and second pairs of wires, and
   the Ethernet equipment is selected from a group consisting of a switch, a concentrator, a repeater and a hub.

8. A terminal capable of being coupled to a network over a line comprising first and second pairs of wires and receiving power via the first and second pairs of wires, the terminal comprising:
- a center tap transformer comprising a first transformer and a second transformer, the first and second transformers capable of being coupled to the first and second pairs of wires, respectively, of the line;
- an electrical signature coupled between center taps of the first and second transformers, the electrical signature specifying a power class of the terminal, which can be determined by Ethernet equipment via the first and second pairs of wires;
- a rectifier bridge coupled between center taps of the first and second transformers, and
- a first detector capable of detecting a signal transmitted via the first and second pairs of wires, said signal notifying the terminal of an inability to be remotely powered.

9. The terminal according to claim 8, wherein the first and second pairs of wires are capable of being used as conductors of a phantom circuit capable of supplying power to the terminal.

10. The terminal according to claim 8, further comprising an alarm coupled to the first detector, wherein the first detector activates the alarm in response to the signal.

11. The terminal according to claim 8, wherein the signal comprises an ac voltage signal, and wherein the first detector is coupled in parallel with the electrical signature.

12. The terminal according to claim 8, further comprising a second detector coupled between the terminals of the rectifier bridge, wherein the second detector is capable of detecting a voltage level of power supplied over the first and second pairs of wires and comparing the detected voltage level with a threshold voltage.

13. The terminal according to claim 12, further comprising a switch, wherein the second detector activates the switch for the terminal to receive power when the detected voltage level is at least as high as the threshold voltage.

14. The terminal according to claim 12, wherein the signal comprises a dc voltage signal, and wherein the first detector is coupled between the second detector and one of the terminals of the rectifier bridge.

15. Ethernet equipment capable of being coupled to a network over a line comprising first and second pairs of wires to a second Ethernet equipment selected from a group consisting of a switch, a concentrator, a repeater, a hub and a terminal, the Ethernet equipment comprising:
- a center tap transformer comprising first and second transformers, said first and second transformers capable of being coupled via the first and second pairs of wires, respectively, to a center tap transformer of the second Ethernet equipment;
- an electrical circuit coupled to center taps of the first and second transformers, the electrical circuit being capable of sending a first signal to the second Ethernet equipment via the first and second pairs of wires to determine power requirements of the second Ethernet equipment; and
- means coupled to the electrical circuit capable of sending a second signal via the first and second pairs of wires to notify the second Ethernet equipment of the inability to be remotely powered, the second signal being sent when the Ethernet equipment is not capable of meeting the power requirements of the second Ethernet equipment.

16. The Ethernet equipment according to claim 15, wherein the second Ethernet equipment comprises an electrical signature indicative of a power class of the second Ethernet equipment, and wherein the first Ethernet equipment determines the power requirements of the second Ethernet equipment by detecting the electrical signature of the second Ethernet equipment.

* * * * *